United States Patent [19]

Tanase et al.

[11] Patent Number: 4,547,470
[45] Date of Patent: Oct. 15, 1985

[54] SIALON-BASE CERAMIC MATERIALS EXCELLENT IN WEAR RESISTANCE

[75] Inventors: Teruyoshi Tanase, Tokyo; Kenichi Nishigaki; Tatsuro Ajima, both of Ohmiya, all of Japan

[73] Assignee: Mitsubishi Kinzoku Kabushiki Kaisha, Tokyo, Japan

[21] Appl. No.: 601,379

[22] Filed: Apr. 17, 1984

[30] Foreign Application Priority Data

Apr. 25, 1983 [JP] Japan .................... 58-72581

[51] Int. Cl.$^4$ .................... C04B 35/56; C04B 35/58
[52] U.S. Cl. .................... 501/87; 264/61; 501/93; 501/97; 501/98
[58] Field of Search ................ 501/97, 98, 87; 264/61

[56] References Cited

U.S. PATENT DOCUMENTS

| | | | |
|---|---|---|---|
| 3,969,125 | 7/1976 | Komeya et al. | 501/98 |
| 4,127,416 | 11/1978 | Lumby et al. | 501/98 |
| 4,252,768 | 2/1981 | Perkins et al. | 501/97 |
| 4,323,323 | 4/1982 | Lumby et al. | 501/98 |
| 4,424,066 | 1/1984 | Sarin et al. | 501/98 |
| 4,426,209 | 1/1984 | Sarin et al. | 501/98 |
| 4,506,020 | 3/1985 | Butler et al | 501/98 |

FOREIGN PATENT DOCUMENTS

56-129667  10/1981  Japan .................... 423/412

OTHER PUBLICATIONS

Grand, G. et al.–"Composition and Stability of Y—Si—Al—O—N Solid Solutions Based on $\alpha$-Si$_3$N$_4$ Structure"–J. Materials Science, 14 (1979)–Letters–pp. 1749-1751.

Mitomo, M. et al.–"The Strength of $\alpha$-Sialon Ceramics", J. Materials Science, 15 (1980) pp. 2661-2662.

Jack, K. H.–"The Significance of Structure and Phase Equilibria in the Development of Silicon Nitride and Sialom Ceramics"–Science of Ceramics, vol. 11 (pub'd by Swedish Ceramic Soc.) (1981) pp. 125, 140-141.

Primary Examiner—Helen M. McCarthy
Attorney, Agent, or Firm—Frishauf, Holtz, Goodman & Woodward

[57] ABSTRACT

Sialon-base ceramic materials having both high hardness and good sinterability and can show excellent wear resistance when used in cutting tools and other wear-resisting tools. A Sialon-base ceramic material according to the invention has main components consisting of $\beta$-Sialon expressed by a chemical formula Si$_{6-z}$Al$_z$O$_z$N$_{8-z}$, z being larger than 0 but not more than 4.3, and $\alpha$-Sialon expressed by a chemical formula M$_x$(Si, Al)$_{12}$(O,N)$_{16}$, x being larger than 0 but not more than 2, M representing at least one selected from the group consisting of Li, Na, Ca, Mg, Y, and any rare earth element, the ratio of the $\alpha$-Sialon/the $\beta$-Sialon being within a range from 25/75 to 95/5 in volume. The Sialon-base ceramic material further includes as a disperse phase-forming component 1–40 percent by volume at least one selected from the group consisting of carbide of Ti, Zr, or Hf, nitride thereof, carbo-nitride thereof, and carbo-oxi-nitride thereof, and as a combined phase-forming component 1–20 percent by volume at least one selected from the group consisting of oxide of any of the above M-forming elements, the above disperse phase-forming metallic elements, Si, or Al, and nitride thereof. Part of the above disperse phase-forming component (S1) may be substituted by at least one (S2) selected from the group consisting of carbide of V, Nb, Ta, or Cr, nitride thereof, carbo-nitride thereof, carbo-oxi-nitride thereof, and carbide of Mo or W, the ratio S2/(S1+S2) being within a range from 0.01 to 0.5 in volume.

10 Claims, No Drawings

SIALON-BASE CERAMIC MATERIALS EXCELLENT IN WEAR RESISTANCE

BACKGROUND OF THE INVENTION

This invention relates to Sialon-base ceramic materials very excellent in wear resistance, and more particularly to Sialon-base ceramic materials adapted for use in cutting tools and other wear-resisting tools.

In recent years, silicon nitride-base ceramic materials have become used in cutting tools and other wear-resisting tools. However, such ceramic materials suffer from low sinterability since silicon nitride (hereinafter referred to as "$Si_3N_4$") is a compound having a strong covalent bond. Therefore, many ceramic materials of this type have conventionally been produced by means of hot pressing. According to the conventional hot pressing method, however, it is difficult to obtain products having complicated shapes from $Si_3N_4$-base ceramic materials, and the method suffers from low yield.

Attempts have been made to employ in cutting tools and other wear-resisting tools Sialon-base ceramic materials, which have higher sinterability than $Si_3N_4$ and also have high thermal shock resistance as well as oxidation resistance. Such Sialon-base ceramic materials are composed mainly of a compound obtained by substituting Al and O, respectively, for part of Si and part of N in the crystal lattice of $\beta$-$Si_3N_4$, that is, $\beta$-Sialon expressed by a chemical formula $Si_{6-z}Al_zO_zN_{8-z}$ where z is larger than 0 but not more than 4.3. Such Sialonbase ceramic materials have high toughness but do not possess sufficient hardness, that is, their hardness is e.g. of the order of 92 in terms of Rockwell hardness (A scale). Therefore, such Sialon-based ceramic materials cannot show satisfactory wear resistance when used in cutting tools and other wear-resisting tools.

OBJECT AND SUMMARY OF THE INVENTION

It is the object of the invention to provide Sialon-base ceramic materials which possess both high hardness and excellent sinterability and can thereofore show excellent wear resistance when used in cutting tools and other wear-resisting tools.

The present invention provides a Sialon-base ceramic material consisting essentially of:

(a) 1-40 percent by volume at least one disperse phase-forming component selected from the group consisting of carbide of Ti, Zr, or Hf, nitride thereof, carbo-nitride thereof, and carbo-oxi-nitride thereof;

(b) 1-20 percent by volume at least one combined phase-forming component selected from the group consisting of oxide of Li, Na, Ca, Mg, Y, any rare earth element, Ti, Zr, Hf, Si, or Al, and nitride thereof; and (c) the balance of $\beta$-Sialon expressed by a chemical formula $Si_{6-z}Al_zO_zN_{8-z}$, z being larger than 0 but not more than 4.3, and $\alpha$-Sialon expressed by a chemical formula $M_x(Si, Al)_{12}(O, N)_{16}$, x being larger than 0 but not more than 2, M representing at least one selected from the group consisting of Li, Na, Ca, Mg, Y, and any rare earth element, and inevitable impurities, wherein the ratio of the $\alpha$-Sialon/the $\beta$-Sialon is within a range from 25/75 to 95/5 in volume.

The invention provides a second Sialon-base ceramic material consisting essentially of:

(a) 1-40 percent by volume at least one disperse phase-forming component (hereinafter referred to as S1) selected from the group consisting of carbide of Ti, Zr, or Hf, nitride thereof, carbo-nitride thereof, and carbo-oxi-nitride thereof, and at least one disperse phase-forming component (hereinafter referred to as S2) selected from the group consisting of carbide of V, Nb, Ta, or Cr, carbo-nitride thereof, carbo-oxi-nitride thereof, carbide of Mo, and carbide of W, wherein the ratio S2/(S1+S2) is within a range from 0.01 to 0.5 in volume;

(b) 1-20 percent by volume at least one combined phase-forming component selected from the group consisting of oxide of Li, Na, Ca, Mg, Y, any rare earth element, Ti, Zr, Hf, V, Nb, Ta, Cr, Mo, W, Si, or Al, and nitride thereof; and (c) the balance, of $\beta$-Sialon expressed by a chemical formula $Si_{6-z}Al_zO_zN_{8-z}$, z being larger than 0 but not more than 4.3, $\alpha$-Sialon expressed by a chemical formula $M_x(Si, Al)_{12}(O, N)_{16}$, x being larger than 0 but not more than 2, M representing at least one selected from the group consisting of Li, Na, Ca, Mg, Y, and any rare earth element, and inevitable impurities, wherein the ratio of the $\alpha$-Sialon/the $\beta$-Sialon is within a range from 25/75 to 95/5 in volume.

The above and other objects, features and advantages of the invention will be more apparent from the ensuing detailed description.

DETAILED DESCRIPTION

Under the aforestated circumstances, the present applicants have made many studies in order to improve conventional Sialon-base ceramic materials composed mainly of the aforementioned $\beta$-Sialon so as to impart higher hardness and accordingly excellent wear resistance to the ceramic materials, without sacrificing the good sinterability thereof. As a result, the applicants have reached the following findings:

(a) A ceramic material will have enhanced hardness and accordingly excellent wear resistance, if it contains, together with the aforementioned $\beta$-Sialon, a compound obtained by substituting part of Si and part of N forming the crystal lattice of $\alpha$-$Si_3N_4$ by Al and by O, respectively, and also contains at least one selected from the group consisting of Li, Na, Ca, Mg, Y, and any rare earth elements (these elements will be hereinafter called generally "M") wherein the M is present interstitially in the crystal lattice in the form of solid solution, that is, an $\alpha$-Sialon expressed by a chemical formula $M_x(Si, Al)_{12}(O, N)_{16}$ wherein x is larger than 0 but not more than 2;

(b) If a ceramic material containing both $\alpha$-Sialon and $\beta$-Sialon as mentioned above also contains, as a disperse phase-forming component, at least one selected from the group consisting of carbide of Ti, Zr, or Hf, nitride thereof, carbo-nitride thereof, and carbo-oxinitride thereof (these compounds will be hereinafter called generally "S1"), the growth of grains of the Sialon will be restrained during sintering of the ceramic material, which improves the sinterability of the ceramic material so that the ceramic material will have further enhanced hardness and accordingly further improved wear resistance;

(c) If in a ceramic material containing both $\alpha$-Sialon and $\beta$-Sialon as well as S1 as mentioned above, part of the S1 is substituted by at least one selected from the group consisting of carbide of V, Nb, Ta, or Cr, nitride thereof, carbo-nitride thereof, and carbooxinitride thereof, carbide of Mo, and carbide of W (these compounds will hereinafter called generally "S2"), the growth of grains of the Sialon will be restrained to a further extent during sintering of the ceramic material, to thereby further improve the hardness and strength of the ceramic material; and (d) If a ceramic material having the chemical composition as stated in the above paragraph (b) or (c) further contains, as a combined phase-forming component, at least one selected from the group consisting of oxides of elements previously stated as the M, metallic elements forming the aforementioned S1 and S2 as disperse phase-forming components, Si, and Al, and nitrides thereof, such combined phase-forming component(s) contained in the ceramic material will have a sufficiently low melting point and therefore will form a liquid phase during sintering of the ceramic material to promote the sintering. In addition, in the sintered ceramic material, the combined phase-forming component(s) exists in a vitreous or crystal state at the grain boundary of the Sialon to densify the sintered ceramic material and accordingly enhance the hardness thereof.

The present invention is based upon the above findings.

Sialon-base ceramic materials according to the invention have the aforestated chemical compositions.

In Sialon-base ceramic materials according to the invention, the ratio ($\alpha/\beta$) of the $\alpha$-Sialon/the $\beta$-Sialon is limited within a range from 25/75 to 95/5 in volume. If the ratio of the $\alpha$-Sialon is less than 25, sufficient increase of the hardness of the ceramic material cannot be obtained, while if the ratio of the $\alpha$-Sialon exceeds 95, the sinterability of the ceramic material will be degraded. Best results of enhancement of the hardness and the wear resistance can be obtained if the ratio of the $\alpha$-Sialon is within a range from 30 to 85 in volume.

The $\beta$-Sialon, which is expressed by the chemical formula $Si_{6-z}Al_zO_zN_{8-z}$ as stated before, must satisfy that the value of z is in the relationship of $0 < z \leq 4.3$, because no composition of the $\beta$-Sialon with the value of z more than 4.3 can exist. Even within the above range, if the value of z is large, large pores can be formed in the resulting ceramic materials, and also the strength of the resulting ceramic materials will decrease. Therefore, the value of z should desirably be larger than 0 but not more than 2.0.

The $\alpha$-Sialon, which is expressed by the chemical formula $M_x(Si, Al)_{12}(O, N)_{16}$ as stated before, should satisfy that the value of x is in the relationship of $0 < x \leq 2$, because if the value of x exceeds 2, the M cannot completely occupy in the form of solid solution holes between atoms in the crystal lattice. The ratio between Si, Al, O, and N varies in dependence on the kind of the M and the value of x and assumes such a value that the positive valence and the negative valence are equal to each other.

In ceramic materials according to the invention, the S1 content is limited within a range from 1 to 40 percent by volume. If the S1 content is smaller than 1 percent by volume, the ceramic materials cannot have required hardness or required wear resistance, whereas if in excess of 40 percent by volume, it will result in degradation in the sinterability as well as spoilage of the thermal shock resistance. Best results of enhancement of the hardness and the wear resistance can be obtained if the S1 content is within a range from 5 to 30 percent by volume.

On the other hand, in ceramic materials according to the invention wherein part of the S1 is substituted by S2, the ratio of substitution of S2, i.e., S2/(S1+S2) is should be within a range from 0.01 to 0.5 in volume, because if the same ratio is less than 0.01, a desired effect of restraint of the grain growth of the Sialon cannot be achieved, whereas in excess of 0.5, degraded sinterability will result.

The content of the above combined phase-forming component is limited within a range from 1 to 20 percent by volume. If the same content is less than 1 percent by volume, the ceramic materials cannot have desired high density, while if in excess of 20 percent by volume, reduced strength of the ceramic materials will result. Best results can be obtained if the same content is within a range from 2 to 10 percent by volume.

To manufacture Sialon-base ceramic materials according to the invention, the following starting powders are first prepared by way of example:

(i) Powders of compounds for forming $\alpha$-Sialon and $\beta$-Sialon, which may be any one of the following combinations (a)–(c):

(a) Powder of $Si_3N_4$ + powder of $Al_2O_3$ + powder of AlN;

(b) Powder of $Si_3N_4$ + powder of $SiO_2$ + powder of AlN;

(c) Powder of $Si_2ON_2$ + Powder of AlN;

(ii) Powders of oxide(s) of M and nitride(s) thereof which can be dissolved as solid solution in the $\alpha$-Sialon and can also form the combined phase;

(iii) Powders of compounds of S1 and S2 for forming the disperse phase, and powders of two or more solid solutions of the S1 and S2 compounds; and (iv) Powders of oxides of metallic elements forming S1 and S2, as combined phase-forming components.

The above $Si_3N_4$ should preferably have a high $\alpha$ phase content.

These starting powders are blended into a predetermined composition. The blending ratio should be so set that the ratios of Al and N are larger than those calculated from the chemical formula of the $\beta$-Sialon. The blended powders are mixed, and the resulting mixture is subjected to hot pressing at a temperature falling within a range from 1550° to 1800° C. Alternatively, a green compact prepared from the mixture is subjected to sintering at a temperature falling within the same range as above.

Although such green compact may be directly exposed to the atmospheric gas during sintering, the heat-affected surface layer of the resulting sintered ceramic material will have an increased thickness. Therefore, preferably such green compact should be buried in powder of $Si_3N_4$ during sintering. Further, the sintering should be carried out in an atmospheric gas containing $N_2$ so as to restrain decomposition of the $Si_3N_4$ during sintering. Preferably, such atmospheric gas may consist of $N_2$ alone, though a mixture gas of $N_2$ and $H_2$ or $N_2$ and Ar may be used instead. The pressure of the atmospheric gas may preferably be set at 1 atmospheric pressure, though it may be set at approximately 0.9 atmospheric pressure. Although more preferably the same pressure may be set at a value higher than 1 atmospheric pressure, a special sintering furnace will then be required. The sintering temperature should range from 1500° to 1800° C. as stated before, and more preferably from 1650° to 1750° C.

Further, ceramic materials thus sintered may further be subjected to hot hydrostatic pressure sintering if required, to densify the ceramic materials.

Examples of the ceramic materials according to the invention will now be described in detail.

EXAMPLE 1

The following starting powders were prepared: powder of $Si_3N_4$ of which the $\alpha$ phase content is 90 percent by volume and powder of CaO, both having a mean grain size of 0.8 $\mu$m, powder $\alpha$-$Al_2O_3$ and powder of MgO, both having a mean grain size of 0.6 $\mu$m, powder of AlN and powder of TiN both having a mean grain size of 1.5 $\mu$m, powder of $Li_2O$, powder of $Na_2O$ and powder of $Y_2O_3$, all having a mean grain size of 1.0 $\mu$m, powder of TiC and powder of $ZrC_{0.5}N_{0.5}$ (hereinafter merely referred to as "ZrCN"), both having a mean grain size of 1.3 $\mu$m, and powder of $HfC_{0.7}N_{0.2}O_{0.1}$ (hereinafter merely referred to as "HfCNO") having a mean grain size of 1.7 $\mu$m. These starting powders were blended into compositions shown in Table 1. Each of the blended powders was mixed in a wet-type ball mill for 72 hours, then dried, and charged into a hot-pressing graphite die. In the graphite die, each mixture was subjected to hot press sintering in the atmosphere under a pressure of 200 Kg/cm$^2$, at a temperature of 1700° C., and for a retention time of 1 hour, to obtain ceramic materials according to the present invention Nos. 1-10, and comparative ceramic materials Nos. 11-14. The comparative ceramic materials Nos. 11-14 each have at least one of its components contained in an amount falling outside the range of the present invention, whose content value is asterisked in Table 1.

Then, the ceramic materials Nos. 1-10 according to the present invention and the comparative ceramic materials Nos. 11-14 obtained as above had their compositions examined by means of microscopic analysis, X-ray diffraction, etc. and also were tested in respect of hardness (Rockwell Hardness: A scale). Further, they were each cut into the form of a cutting insert according to SNGN 432 (ISO: SNGN 120408). The cutting inserts tips were subjected to a hard cast iron-cutting test under the following cutting conditions:

Work Material: Cast Iron (Chilled roll with a Shore Hardness degree of 90);
Cutting Speed: 50 m per minute;
Feed Rate: 0.15 mm per rev.;
Depth of Cut: 0.5 mm;
Cutting Time: 5 minutes In the above cutting test, the flank wear of each cutting insert was measured. The results of measurements are also shown in Table 1.

It will be learned from Table 1 that the ceramic materials Nos. 1-10 according to the invention show very excellent characteristics in respect of hardness and wear resistance, while the results of the comparative ceramic materials Nos. 11-14 in the table show that if one or more components of a ceramic material of this kind have contents falling outside the range of the present invention, it will be much inferior in wear resistance for lack of sufficient hardness and also will be easily chipped during cutting.

TABLE 1

| Specimen | CHEMICAL COMPOSITION OF STARTING POWDER (% by volume) | | | | | COMPOSITION OF CERAMIC MATERIALS (% by volume) | | | ROCKWELL HARDNESS (A scale) | FLANK WEAR (mm) |
|---|---|---|---|---|---|---|---|---|---|---|
| | SIALON-FORMING COMPOUND | | | DISPERSE PHASE-FORMING COMPOUND | COMBINED PHASE-FORMING COMPOUND | RATIO $\alpha/\beta$ | DISPERSE PHASE | COMBINED PHASE | | |
| | $Si_3N_4$ | AlN | $Al_2O_3$ | | | | | | | |
| CERAMIC MATERIALS ACCORDING TO THE PRESENT INVENTION | | | | | | | | | | |
| 1 | 86.1 | 6.5 | 0.4 | TiN:2 | MgO:5 | 30/70 | 2 | 4 | 93.8 | 0.21 |
| 2 | 75.0 | 6.9 | 0.1 | ZrCN:10 | $Na_2O$:3, MgO:5 | 60/40 | 10 | 7 | 94.3 | 0.18 |
| 3 | 67.0 | 8.0 | — | HfCNO:15 | CaO:10 | 50/50 | 15 | 8 | 94.1 | 0.19 |
| 4 | 59.3 | 5.5 | 0.2 | TiC:20 | $Li_2O$:15 | 60/40 | 20 | 10 | 94.4 | 0.16 |
| 5 | 57.6 | 5.8 | 0.6 | TiN:10, ZrCN:10 | $Li_2O$:1, $Y_2O_3$:15 | 30/70 | 20 | 13 | 94.2 | 0.17 |
| 6 | 58.0 | 4.0 | — | TiN:30 | $Na_2O$:8 | 40/60 | 30 | 6 | 94.0 | 0.20 |
| 7 | 39.6 | 5.4 | — | ZrCN:20, HfCNO:15 | $Y_2O_3$:20 | 90/10 | 35 | 18 | 94.5 | 0.15 |
| 8 | 40.0 | 5.0 | — | TiC:20, TiN:20 | $Y_2O_3$:15 | 80/20 | 40 | 13 | 94.3 | 0.18 |
| 9 | 41.5 | 5.5 | — | TiC:5, ZrCN:20, HfCNO:10 | $Y_2O_3$:5, MgO:13 | 70/30 | 35 | 15 | 94.0 | 0.21 |
| 10 | 51.3 | 3.6 | 0.1 | ZrCN:25 | $Li_2O$:1, MgO:5, $Y_2O_3$:14 | 50/50 | 25 | 17 | 93.9 | 0.23 |
| COMPARATIVE CERAMIC MATERIALS | | | | | | | | | | |
| 11 | 88.3 | 6.3 | 0.4 | — | MgO:5 | 30/70 | —* | 3 | 93.6 | 0.45 |
| 12 | 36.4 | 3.0 | 0.6 | TiN:50 | $Y_2O_3$:10 | 5/95* | 50* | 8 | 92.6 | chipped after 2 minutes |
| 13 | 86.0 | 1.3 | 2.7 | ZrCN:10 | — | 0/100 | 10 | —* | could not be tested due to low density | could not be used for cutting |
| 14 | 86.2 | 2.2 | 4.6 | — | $Y_2O_3$:7 | 0/100 | —* | 10 | 91.8 | chipped after 1 minute |

EXAMPLE 2

Prepared as the starting powders were powder of $Er_2O_3$ having a mean grain size of 0.5 μm, and powder of $TiC_{0.3}N_{0.7}$ (hereinafter referred to as "TiCN") and powder of YN, both having a mean grain size of 1.6 μm, in addition to powder of $Si_3N_4$, powder of AlN, powder of α-$Al_2O_3$, powder of $Y_2O_3$, and powder of ZrCN which are the same as those used in Example 1. These starting powders were blended into compositions shown in Table 2. Each of the blended powders was mixed and dried under the same conditions as in Example 1. Then, each of the mixtures was pressed under a pressure of 1 ton/cm² into a green compact, and the green compact was subjected to sintering in a state buried in powder of $Si_3N_4$ in an atmospheric $N_2$ gas under 1 atmospheric pressure at a temperature of 1720° C. and for a retention time of 2 hours, to obtain ceramic materials Nos. 15–19 according to the present invention and comparative ones Nos. 20–22.

The above ceramic materials Nos. 15–19 according to the present invention and the comparative ones Nos. 20–22 were examined in respect of composition and hardness in the same manners as in Example 1, and from which were obtained cutting inserts according to SNGN 432 ISO: SNGN 120408). The cutting inserts were then subjected to a cast iron-milling test under the following testing conditions:

Cutter: Double Negative type cutter having a diameter of 160 mm;

high hardness and excellent wear resistance, while the comparative ceramic materials Nos. 20–22, of which one or more components have contents falling outside the range of the present invention, show interior characteristics to the ceramic materials according to the invention in respect of hardness and wear resistance.

EXAMPLE 3

Prepared as the starting powders were powder of VC, powder of ZrN, and powder of solid solution (W, Ti)CN (WC/TiC/TiN=60/25/15 in weight), all having a mean grain size of 1.8 μm, powder of solid solution (Nb, Ta)CNO (NbC/TaN/TaO=70/29/1 in weight) and powder of $Cr_3C_2$, both having a mean grain size of 1.5 μm, and powder of $Mo_2C$ having a mean grain size of 1.2 μm, in addition to powder of $Si_3N_4$, powder of AlN, powder of α-$Al_2O_3$, and powder of $Y_2O_3$, which are the same as those used in Example 1, and also to powder of TiCN which is the same as that used in Example 2. These starting powders were blended into compositions shown in Table 3. Each of the blended powders was mixed and dried under the same conditions as in Example 1. Thereafter, the dried mixtures were each subjected to hot press sintering under the same conditions as in Example 1, except that the hot press-sintering temperature was 1670° C., to obtain ceramic materials Nos. 23–27 according to the present invention and comparative ones Nos. 28 and 29.

The ceramic materials Nos. 23–27 according to the invention and comparative ones Nos. 28 and 29 were

TABLE 2

| | CHEMICAL COMPOSITION OF STARTING POWDER (% by volume) | | | | | COMPOSITION OF CERAMIC MATERIALS (% by volume) | | | | |
|---|---|---|---|---|---|---|---|---|---|---|
| | SIALON-FORMING COMPOUND | | | DISPERSE PHASE-FORMING | COMBINED PHASE-FORMING | RATIO | DIS-PERSE | COM-BINED | ROCKWELL HARDNESS | FLANK WEAR |
| Specimen | $Si_3N_4$ | AlN | $Al_2O_3$ | COMPOUND | COMPOUND | α/β | PHASE | PHASE | (A scale) | (mm) |
| CERAMIC MATERIALS ACCORDING TO THE PRESENT INVENTION | | | | | | | | | | |
| 15 | 76.5 | 8.5 | — | TiCN:5 | $Y_2O_3$:10 | 70/30 | 5 | 8 | 94.1 | 0.23 |
| 16 | 77.2 | 5.8 | — | ZrCN:2 | $Er_2O_3$:15 | 50/50 | 2 | 13 | 93.8 | 0.25 |
| 17 | 65.8 | 5.0 | 0.2 | TiCN:7 ZrCN:2 | YN:20 | 60/40 | 9 | 17 | 94.0 | 0.21 |
| 18 | 78.7 | 6.9 | 0.4 | TiCN:4 | $Y_2O_3$:5 $Er_2O_3$:5 | 30/70 | 4 | 7 | 93.9 | 0.27 |
| 19 | 73.3 | 5.5 | 0.2 | ZrCN:6 | $Y_2O_3$:5 YN:10 | 40/60 | 6 | 12 | 93.8 | 0.26 |
| COMPARATIVE CERAMIC MATERIALS | | | | | | | | | | |
| 20 | 86.2 | 2.2 | 4.6 | — | $Y_2O_3$:7 | 0/100 | —* | 9 | 92.0 | 0.45 |
| 21 | 82.7 | 7.2 | 0.6 | TiCN:0.1 | $Y_2O_3$:10 | 30/70 | 0.1* | 8 | 93.5 | 0.42 |
| 22 | 46.4 | 3.5 | 0.1 | ZrCN:45 | $Er_2O_3$:5 | 40/60 | 45* | 4 | could not be tested due to low density | could not be used for cutting |

*falls outside the range of the present invention

Work Material: Square bar of gray cast iron according to FC 25 (JIS) having a size of 150 mm in width and 400 mm in length;
Cutting Speed: 300 m per minute;
Depth of Cut: 2 mm;
Feed Rate: 0.17 mm per tooth;
Cutting Time: 1 hour;
Cutting Manner: The cutting insert was mounted on the cutter and cutting was effected with center of the cutter aligned with the transverse center of the work material.

In the above milling test, the flank wear of each cutting insert was measured. The results of measurements are also shown in Table 2.

It will be learned from Table 2 that the ceramic materials Nos. 15–19 according to the invention has very examined in respect of composition and hardness under the same conditions as in Example 1, and from which were obtained cutting inserts according to SNGN 432 (ISO: SNGN 120408). The cutting inserts were then subjected to a hardened steel-cutting test under the following cutting conditions:

Work Material: Round bar of Steel SKD-61 of JIS (HRC Hardness: 55);
Cutting Speed: 120 m per minute;
Depth of Cut: 0.5 mm;
Feed Rate: 0.2 mm per rev.;
Coolant: Continuous lubrication of water-soluble oil;
Cutting Time: 15 minutes In the above cutting test, the flank wear of each cutter tip was measured. The results of measurements are also shown in Table 3. Table 3 also shows results of a hardened steel-cutting test conducted on a conventional $Al_2O_3$-base ceramic material sold on the market, for comparison.

TABLE 3

| | CHEMICAL COMPOSITION OF STARTING POWDER (% by volume) | | | | | | COMPOSITION OF CERAMIC MATERIALS (% by volume) | | | | ROCK-WELL | |
|---|---|---|---|---|---|---|---|---|---|---|---|---|
| | SIALON-FORMING COMPOUND | | | DISPERSE PHASE-FORMING COMPOUND | | COMBINED PHASE-FORMING | RATIO | DIS-PERSE | COM-BINED | RATIO $S_2/$ | HARD-NESS | FLANK WEAR |
| Specimen | $Si_3N_4$ | AlN | $Al_2O_3$ | $S_1$ | $S_2$ | COMPOUND | $\alpha/\beta$ | PHASE | PHASE | $(S_1 + S_2)$ | (A scale) | (mm) |
| CERAMIC MATERIALS ACCORDING TO THE PRESENT INVENTION | | | | | | | | | | | | |
| 23 | 77.1 | 6.7 | 0.2 | TiCN:5 | VC:1 | $Y_2O_3$:10 | 60/40 | 6 | 8 | 0.17 | 94.1 | 0.30 |
| 24 | 72.1 | 10.8 | 0.1 | (W,Ti)CN:10 | | $Y_2O_3$:7 | 70/30 | 10 | 6 | 0.33 | 94.4 | 0.33 |
| 25 | 60.5 | 8.0 | 0.5 | ZrN:20 | (Nb,Ta)CNO:5 | $Y_2O_3$:6 | 40/60 | 25 | 4 | 0.20 | 94.2 | 0.30 |
| 26 | 58.7 | 5.0 | 0.3 | ZrN:30 | $Cr_3C_2$:1 | $Y_2O_3$:5 | 50/50 | 31 | 4 | 0.03 | 94.2 | 0.28 |
| 27 | 68.4 | 8.4 | 0.2 | TiCN:5 ZrN:5 | $Mo_2C$:5 | $Y_2O_3$:8 | 60/40 | 15 | 6 | 0.33 | 94.1 | 0.31 |
| COMPARATIVE CERAMIC MATERIALS | | | | | | | | | | | | |
| 28 | 70.4 | 5.8 | 0.8 | TiCN:5 | $Cr_3C_2$:10 | $Y_2O_3$:8 | 5/95 | 15 | 6 | 0.67* | 93.3 | 0.56 |
| 29 | 79.9 | 8.0 | 0.1 | — | — | $Y_2O_3$:12 | 60/40 | —* | 10 | —* | 93.7 | 0.75 |
| $Al_2O_3$—based on the Market | | | | | | $Al_2O_3$—25% by volume TiC | | | | | 93.7 | chipped after 10 seconds |

*falls outside the range of the present invention

It will be learned from Table 3 that the ceramic materials Nos. 23-27 according to the invention show very excellent characteristics in respect of hardness and wear resistance, while the comparative ceramic materials Nos. 28 and 29, of which one or more components have contents falling outside the range of the present invention, and the $Al_2O_3$-base ceramic material all show inferior characteristics to the ceramic materials according to the invention particularly in respect of wear resistance.

As stated above, ceramic materials according to the present invention possess high hardness and can show excellent wear resistance in practical use. Therefore, they can stably exhibit excellent performance as cutting tools or other wear-resisting tools for a long period of time.

What is claimed is:

1. A Sialon-base ceramic material consisting essentially of:
   (a) 1-40 percent by volume at least one dispersed phase-forming component selected from the group consisting of carbide of Ti, Zr, or Hf, nitride thereof, carbo-nitride thereof, and carbo-oxi-nitride thereof;
   (b) 1-20 percent by volume at least one combined phase-forming component selected from the group consisting of oxide of Li, Na, Ca, Mg, Y, any rare earth element, Ti, Zr, Hf, Si, or Al, and nitride thereof; and
   (c) the balance of $\beta$-Sialon expressed by a chemical formula $Si_{6-z}Al_zO_zN_{8-z}$, z being larger than 0 but not more than 4.3, and $\alpha$-Sialon expressed by a chemical formula $M_x(Si, Al)_{12}(O, N)_{16}$, x being larger than 0 but not more than 2, M representing at least one selected from the group consisting of Li, Na, Ca, Mg, Y, and any rare earth element, and inevitable impurities, wherein the ratio of the $\alpha$-Sialon/the $\beta$-Sialon is within a range from 25/75 to 95/5 in volume.

2. The Sialon-base ceramic material as claimed in claim 1, wherein the ratio of the $\alpha$-Sialon/the $\beta$-Sialon is within a range from 30/70 to 85/15 in volume.

3. The Sialon-base ceramic material as claimed in claim 1, wherein z is larger than 0 but not more than 2.0.

4. The Sialon-base ceramic material as claimed in claim 1, wherein said at least one disperse phase-forming component is contained in an amount from 5 to 30 percent by volume.

5. The Sialon-base cermaic material as claimed in claim 1, wherein said at least one combined phase-forming component is contained in amount from 2 to 10 percent by volume.

6. The Sialon-base ceramic material consisting essentially of:
   (a) 1-40 percent by volume at least one dispersed phase-forming component (hereinafter referred to as S1) selected from the group consisting of carbide of Ti, Zr, or Hf, nitride thereof, carbo-nitride thereof, and carbo-oxi-nitride thereof, and at least one disperse phase-forming component (hereinafter referred to as S2) selected from the group consisting of carbide of V, Nb, Ta, or Cr, carbo-nitride thereof, carbo-oxi-nitride thereof, carbide of Mo, and carbide of W, wherein the ratio $S2/(S1+S2)$ is within a range from 0.01 to 0.5 in volume;
   (b) 1-20 percent by volume at least one combined phase-forming component selected from the group consisting of oxide of Li, Na, Ca, Mg, Y, any rare earth element, Ti, Zr, Hf, V, Nb, Ta, Cr, Mo, W, Si, or Al, and nitride thereof; and
   (c) the balance of $\beta$-Sialon expressed by a chemical formula $Si_{6-z}Al_zO_zN_{8-z}$, z being larger than 0 but not more than 4.3, and $\alpha$-Sialon expressed by a chemical formula $M_x(Si, Al)_{12}(O, N)_{16}$, x being larger than 0 but not more than 2, M representing at least one selected from the group consisting of Li, Na, Ca, Mg, Y, and any rare earth element, and inevitable impurities, wherein the ratio of the $\alpha$-Sialon/the $\beta$-Sialon is within a range from 25/75 to 95/5 in volume.

7. The Sialon-base ceramic material as claimed in claim 6, wherein the ratio of the α-Sialon/the β-Sialon is within a range from 30/70 to 85/15 in volume.

8. The Sialon-base ceramic material as claimed in claim 6, wherein z is larger than 0 but not more than 2.0.

9. The Sialon-base ceramic material as claimed in claim 6, wherein said S1 and S2 are contained in an amount from 5 to 30 percent by volume in total.

10. The Sialon-base ceramic material as claimed in claim 6, wherein said at least one combined phase-forming component is contained in an amount from 2 to 10 percent by volume.

* * * * *

UNITED STATES PATENT AND TRADEMARK OFFICE
CERTIFICATE OF CORRECTION

PATENT NO. : 4,547,470
DATED : October 15, 1985
INVENTOR(S) : Tetuyoshi TANASE et al It is certified that error appears in the above-identified patent and that said Letters Patent is hereby corrected as shown below:

In the Abstract, line 2, delete "and" (second instance);

Column 1, line 42, change "thereofore" to --therefore--;

Column 1, line 59, change "carbo-oxinitride" to --carbo-oxi-nitride--;

Column 3, line 3, change "carbooxi" to --carbo-oxi- --;

Column 4, line 7, delete "is";

Column 5, line 2, change "1500°-1800°C" to --1550°-1800°C--;

Column 5, line 14, after "powder" insert --of--;

Column 5, above line 64 and under the Table, insert --*falls outside the range of the present invention.--;

Column 7, line 68, change "has" to --have--;

Column 8, line 4, change "interior" to --inferior--;

Column 8, line 11, change "in" to --by--.

Signed and Sealed this

Tenth Day of June 1986

[SEAL]

Attest:

DONALD J. QUIGG

*Attesting Officer*  *Commissioner of Patents and Trademarks*